G. MOEBS.
CIGAR BUNCHING MACHINE.
No. 10,629. Reissued July 28, 1885.
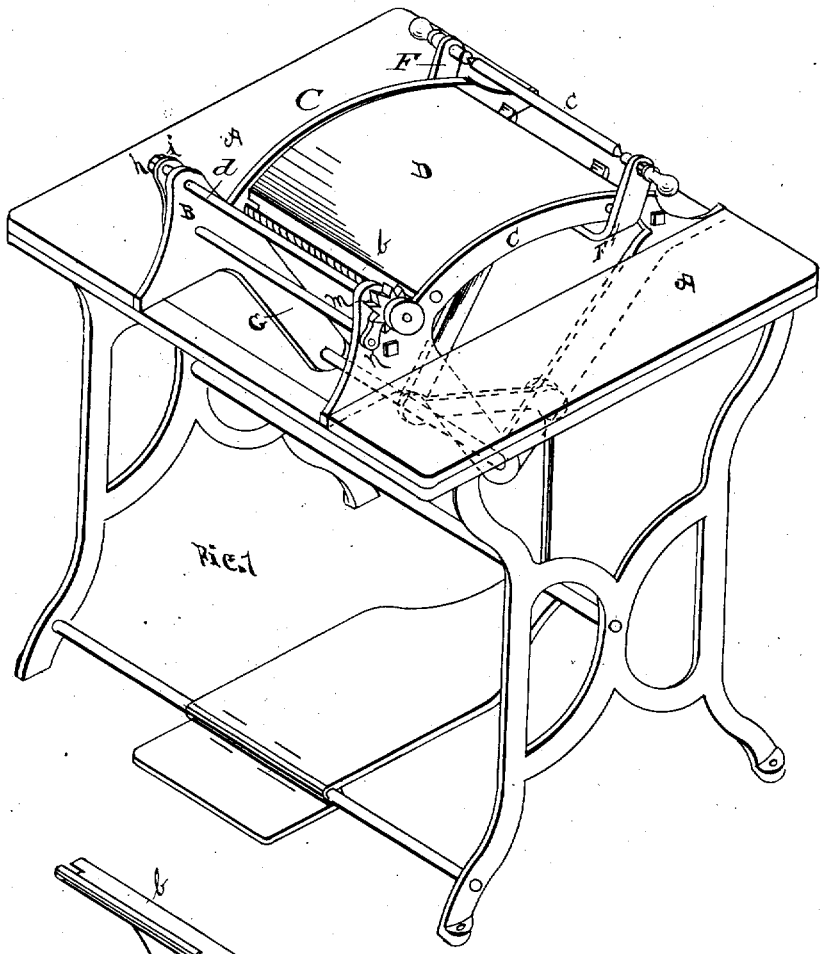
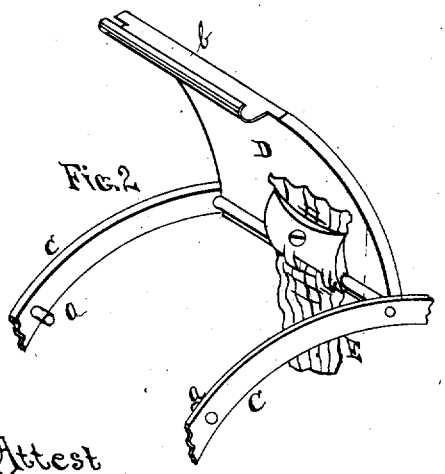
Attest
W. H. Boyle
J. H. Dirle
Inventor
George Moebs
By
Rasor & Wheeler Atty
N. PETERS, Photo-Lithographer, Washington, D. C.

UNITED STATES PATENT OFFICE.

GEORGE MOEBS, OF DETROIT, MICHIGAN.

CIGAR-BUNCHING MACHINE.

SPECIFICATION forming part of Reissued Letters Patent No. 10,629, dated July 28, 1885.

Original No. 266,711, dated October 31, 1882. Application for reissue filed June 6, 1884.

*To all whom it may concern:*

Be it known that I, GEORGE MOEBS, of Detroit, in the county of Wayne and State of Michigan, have invented new and useful Improvements in Cigar-Bunching Machines; and I do hereby declare that the following is a full, clear, and exact description thereof, reference being had to the accompanying drawings, which form a part of this specification.

My present invention relates to that class of machines which form from the leaves of tobacco the body or main portion of a cigar, known as the "bunch;" and my improvements consist in the construction and arrangement of parts as hereinafter set forth, and pointed out in the claims.

Figure 1 is a perspective view of my improved machine. Fig. 2 is a detail perspective showing the bunching-cloth E attached to the rear under portion of the pivoted bunching-table D.

In the drawings, forming a part of this specification, A A represent two parts of the table-top, resting upon frame-work, leaving the center of the table open where the operating parts of my machine are placed, as shown in Fig. 1.

B represents a suitable frame-work, consisting of two curved bars, C C, the ends of which are supported upon standards at front and rear, as shown.

D is the bunching-table proper, the upper plane of which is curved. The curvature of said table and its supporting-bars C C are equally the same, as shown in Fig. 1. The curvature of the table D is such that when the reciprocating yoke F, carrying the rod *c*, is moved forward and back, (as in the act of forming a cigar bunch,) said rod will travel on a circle, being at all times parallel with the upper plane of the bunching-table D. Said table is hinged or pivotally secured at the rear end between the supporting-bars C C. Said bars at the front are provided with lugs or stops *a a*, to prevent the forward and free end of the table D from dropping below the curved planes of the supporting-bars C C. I provide the front end of the table with a recess or pocket, *b*. A bunching-cloth, E, is attached to the rear under portion of the table D, (see Fig. 2,) passing thence over the rod or roller *c*, is laid forward over the bunching-table, and is secured to and wound around the front roller, *d*. It will be observed by this arrangement, to adjust the bunching-cloth E you simply disengage it from the roller *d* and turn the table D back upon its pivots, as shown in Fig. 2, when said cloth may easily be removed or adjusted, as occasion may require. The rod or roller *c* is adjustably secured by any known means between the upper ends of the yoke F, the lower end of which is pivotally secured between the downwardly-projecting standards G G. The roller *d* is journaled in the bearings at the top of the front standards, as shown in Fig. 1, with projecting ends, upon one of which is the nut *h*. A spring, *i*, is secured to the side of the standard, and its upper end embraces the roller between the nut and the standard, being so arranged as to exert its force upon the nut and keep the roller drawn in that direction, except when forcibly drawn in the opposite direction by hand sufficiently far to disengage the notches of the ratchet *m*, which is secured upon this end of the roller, from the stop *n* on the side of the standard, which is designed to engage with the notches in the ratchet and prevent the rotation of the roller, except when disengaged.

When by expanding, the cloth breaks, or it becomes necessary to replace it because it is worn out, heretofore it has been the common practice to remove the bunching-table by removing its fastenings, then detaching or adjusting the bunching-cloth as occasion required. With my improved pivoted table this is not necessary, as by elevating the front end of the bunching-table it turns or swings upon its pivots or hinges, presenting the under rear surface at the point of attachment of the cloth to the operator, as clearly shown in Fig. 2, who can readily engage or disengage the cloth. When it is desired to change the size of the bunches being made, this is done by simply withdrawing the roller against the force of the spring until the ratchet disengages from the stop, when the roller may be easily turned to shorten or increase the length of the cloth, and by this means of so regulating this length a large saving of time and trouble is effected when such change is desired.

The operation in detail of bunching or forming the body of a cigar by means of a bunching-table and a bunching-cloth are so well known that a description thereof is deemed unnecessary in this connection.

Having thus fully described my present invention, what I claim as new, and desire to secure by Letters Patent, is—

1. In a cigar-bunching machine, a curved table supported between and hinged or pivotally secured to bars of coincident curvature, which are provided with stops to arrest the fall of the free end of the table, and an apron secured to the under side of said table, substantially as and for the purposes set forth.

2. In a cigar-bunching machine, the combination of a curved table, hinged or pivoted as shown, and an apron or bunching-cloth, with a ratcheted roller, and a spring for holding said roller in locked position until the force of said spring is overcome, as specified.

3. The curved table D, having trough *b*, and hinged as shown, combined with the curved frame C C, having stops *a a*, and with the apron E, secured to the under side of said table D, as set forth.

4. The combination of the curved hinged table D, frames C C and A A, roller *e*, and apron E, as shown, with the roller *d*, having rack *m*, pawl *n*, nut *h*, and spring *i*, as and for the purposes specified.

5. The combination of the apron E and roller *e* with the roller *d*, having rack *m*, the pawl *n*, nut *h*, and spring *i*, as set forth.

GEORGE MOEBS.

Witnesses:
ALEX. T. HURST,
CHAS. H. TUTTLE, Jr.